(12) United States Patent
Hori et al.

(10) Patent No.: US 8,814,027 B2
(45) Date of Patent: Aug. 26, 2014

(54) ROTATION TOOL FOR JOINING INNER CORNER AND JOINING INNER CORNER METHOD USING THE SAME

(75) Inventors: Hisashi Hori, Shizuoka (JP); Nobushiro Seo, Shizuoka (JP)

(73) Assignee: Nippon Light Metal Company, Ltd., Tokyo (JP)

( * ) Notice: Subject to any disclaimer, the term of this patent is extended or adjusted under 35 U.S.C. 154(b) by 0 days.

(21) Appl. No.: 13/500,935

(22) PCT Filed: Aug. 12, 2010

(86) PCT No.: PCT/JP2010/063712
§ 371 (c)(1),
(2), (4) Date: Apr. 9, 2012

(87) PCT Pub. No.: WO2011/043127
PCT Pub. Date: Apr. 14, 2011

(65) Prior Publication Data
US 2012/0193401 A1 Aug. 2, 2012

(30) Foreign Application Priority Data
Oct. 9, 2009 (JP) .................................. 2009-234701

(51) Int. Cl.
*B23K 20/12* (2006.01)
*B23K 31/02* (2006.01)
(52) U.S. Cl.
USPC ............................ 228/2.1; 228/2.3; 228/112.1
(58) Field of Classification Search
USPC ......................... 228/2.1, 112.1, 2.3
See application file for complete search history.

(56) References Cited

U.S. PATENT DOCUMENTS 6,669,075 B2 * 12/2003 Colligan ......................... 228/2.3
6,742,697 B2 * 6/2004 McTernan et al. ........... 228/112.1
(Continued)

FOREIGN PATENT DOCUMENTS

| CN | 1436110 A | 8/2003 |
| JP | 11-010365 A | 1/1999 |

(Continued)

OTHER PUBLICATIONS

International Search Report corresponding to International Patent Application No. PCT/JP2010/063712 dated Nov. 16, 2010 and English translation thereof.

(Continued)

*Primary Examiner* — Devang R Patel
(74) *Attorney, Agent, or Firm* — Squire Patton Boggs (US) LLP

(57) ABSTRACT

The present invention provides an economic rotation tool for joining a pair of metal members which form an inner corner by abutting the pair of metal members (1) each other, and a joining inner corner method using the same. The rotation tool for joining the pair of metal members which form an inner corner (1) by abutting the pair of metal members each other to perform friction stir welding on an inner corner portion formed by abutting a pair of metal members against each other comprising: a stirring pin (3) to be inserted into the inner corner portion; and a base block (2) supporting the stirring pin (3) and to be brought into contact with one and the other of the pair of metal members respectively, wherein the base block (2) includes: a body portion (4) having a taper shape; and a shoulder portion (5) formed detachably at a tip of the body portion, and the body portion (4) and the shoulder portion (5) are penetrated by the stirring pin (3).

10 Claims, 8 Drawing Sheets

(56) References Cited

U.S. PATENT DOCUMENTS

| | | |
|---|---|---|
| 6,779,704 B2 | 8/2004 | Nelson et al. |
| 7,677,427 B2 * | 3/2010 | Fukuhara et al. .............. 228/2.1 |

FOREIGN PATENT DOCUMENTS

| | | | |
|---|---|---|---|
| JP | 11-047959 A | | 2/1999 |
| JP | 11-226759 A | | 8/1999 |
| JP | 11-320128 A | | 11/1999 |
| JP | 11320128 A | * | 11/1999 |
| JP | 2000-301361 A | | 10/2000 |
| JP | 2001-237621 A | | 8/2001 |
| JP | 2001-321965 A | | 11/2001 |
| JP | 2003-001440 A | | 1/2003 |
| JP | 2003-149382 A | | 5/2003 |
| JP | 2003-326375 A | | 11/2003 |
| JP | 2004-358513 A | | 12/2004 |
| JP | 2009-006396 A | | 1/2009 |
| JP | 4240579 B2 | | 1/2009 |
| JP | 2009-142845 A | | 7/2009 |
| WO | 2007/132252 A1 | | 11/2007 |

OTHER PUBLICATIONS

Notice of Third Party Submission from Japanese Patent Office application JP-2009-234701 dated Oct. 17, 2012.
Notification of First Office Action dated Jan. 23, 2014 corresponding to Chinese Patent Application No. 201080045798.1.

* cited by examiner

FIG.1
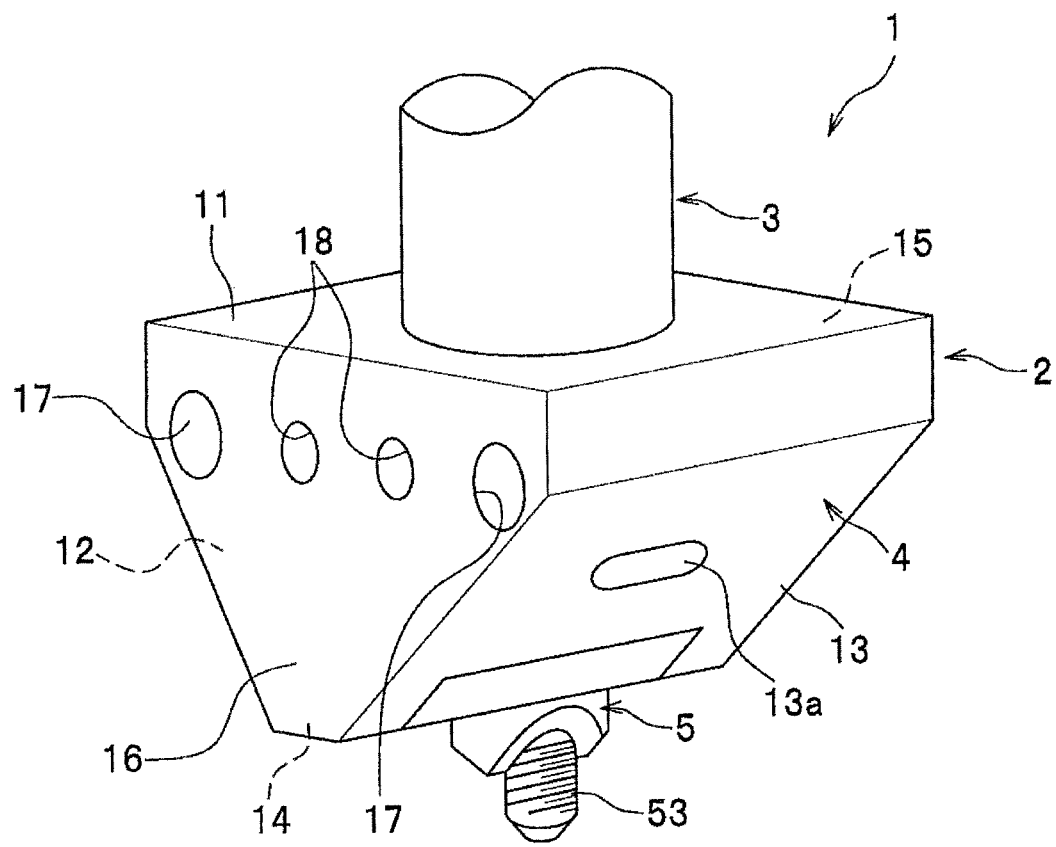
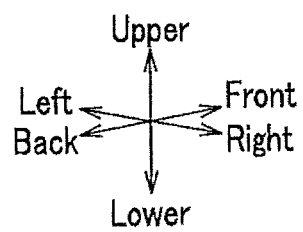

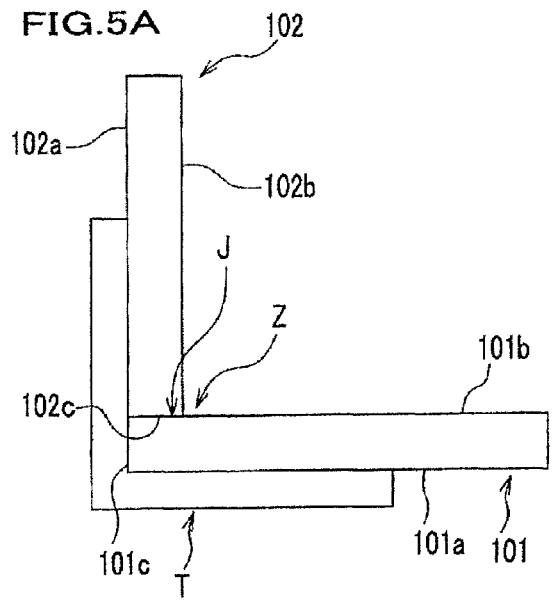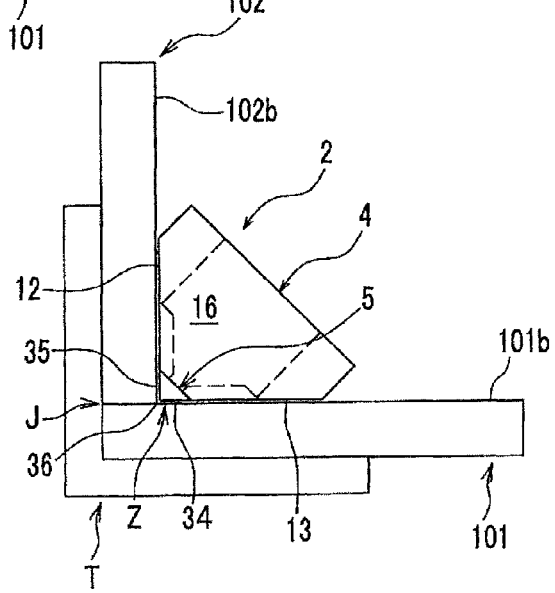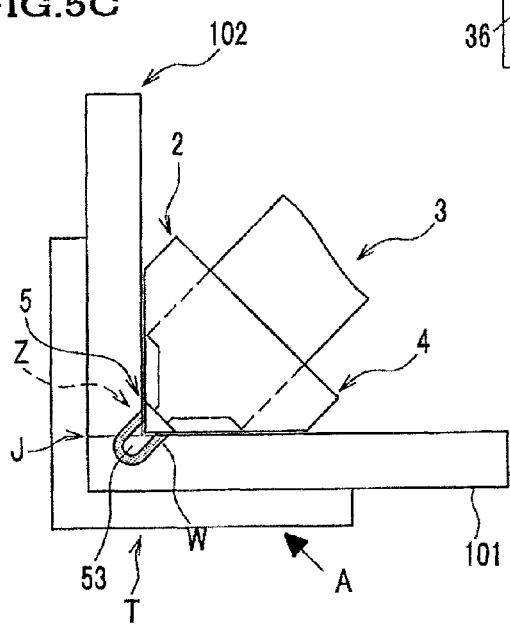

ROTATION TOOL FOR JOINING INNER CORNER AND JOINING INNER CORNER METHOD USING THE SAME

TECHNICAL FIELD

The present invention relates to a rotation tool for joining a pair of metal members which form an inner corner by abutting the pair of metal members each other to perform friction stir welding on an inner corner portion formed by abutting the pair of metal members against each other and a joining inner corner method using the same.

BACKGROUND ART

For example, Patent literature 1 discloses a technique of performing friction stir welding on the inner corner portion at which a pair of metal members are abutted vertically against each other. This technique teaches a rotation tool having a base block in a triangular prism shape and a stirring pin which penetrates the base block for joining a pair of metal members which form an inner corner by abutting the pair of metal members each other. In this technique the friction stir welding is performed by bringing each slope of the base block into contact with each of the pair of metal members respectively and by rotating the stirring pin at high speed while pushing the stirring pin into an inner corner portion.

CITATION LIST

Patent Literature

Patent Literature 1: Japanese Patent No. 4240579

SUMMARY OF INVENTION

Problem to be Solved by the Invention

The conventional technique has a disadvantage that a periphery part of the stirring pin located at the tip of the base block is easily worn out, since the stirring pin is inserted into the metal members being at a high rotation speed. In some cases, it is necessary to replace the entire base block, even if only such part is worn. As a result, the conventional technique has a problem of the high equipment cost.

From this point of view, the present invention provides an economic rotation tool for joining a pair of metal members which form an inner corner by abutting the pair of metal members each other and a joining inner corner method using the same.

Means for Solving the Problem

To solve the above problems, the present invention provides a rotation tool for joining a pair of metal members which form an inner corner by abutting the pair of metal members each other by performing friction stir welding on an inner corner portion formed by abutting a pair of metal members against each other comprising: a stirring pin to be inserted into the inner corner portion; and a base block supporting the stirring pin and to be brought into contact with one and the other of the pair of metal members respectively, wherein the base block includes: a body portion having a tapered shape that becomes thinner towards the tip of the body portion; and a shoulder portion formed detachably at the tip of the body portion, wherein the stirring pin penetrates the body portion and the shoulder portion.

According to the structure described above, the shoulder portion is mounted detachably at the tip of the body portion. Therefore, it is possible to exchange the shoulder portion selectively. Consequently, it is not necessary to replace the entire base block. As a result, the equipment cost can be reduced.

In addition, the body portion has an opposing face, opposite to the inner corner portion, formed on the tip of the body portion. Preferably, a tip of the shoulder portion projects towards the tip side of the stirring pin beyond the opposing face.

According to the structure described above, the opposing face of the body portion is set back from the tip of the shoulder portion. Therefore, the base block does not hit the inner corner portion during friction stir welding. As a result, the friction stir welding is performed smoothly.

Further, it is preferable that the body portion has a sloping cut portion formed at one end portion on the tip of the body portion, being apart from the tip side of the stirring pin. Furthermore, it is preferable that the shoulder portion has a sloping cut portion formed at one end portion on the tip of the shoulder portion, being apart from the tip side of the stirring pin.

Portions of the base block and the shoulder portion located at the front side of the rotating tool in the traveling direction tends to interfere with the inner corner portion during friction stir welding. To solve this problem, the friction stir welding is performed using a rotating tool provided with cut portions formed on the body portion and the shoulder portion. As a result, the base block can travel smoothly.

Further, it is preferable that the body portion has a body portion tapered hole having a tapered shape that becomes thinner towards the tip inside the body portion, and the stirring pin has a tapered stirring pin portion having a tapered shape that becomes thinner towards the tip, wherein the tapered stirring pin portion made to abut on and supported by the inner circumferential surface of the body portion tapered hole.

According to the structure described above, positioning the stirring pin at the base block in depth direction can be performed easier, attaching and detaching the stirring pin and the base block can be performed easily.

Further, it is preferable that the body portion has a cooling hole for a coolant to flow through. According to this structure, the temperature inside of the base block can be lowered.

Further, it is preferable that a bearing is disposed between the body portion and the stirring pin. According to this structure, the stirring pin can be rotated smoothly.

Furthermore, the present invention provides a method for joining a pair of metal members which form an inner corner by abutting the pair of metal members each other using the rotation tool according to any one of the aspects described above, wherein friction stir welding is performed on an inner corner portion formed by abutting a pair of a first metal member and a second metal member against each other. According to the method described above, the inner corner portion can be joined easily. Moreover, manufacturing cost can be reduced.

Furthermore, it is preferable that preliminary tack welding is performed on the inner corner portion, before performing the friction stir welding on the inner corner portion. According to the method described above, a pair of metal members can be prevented from being apart from each other during friction stir welding. Therefore, working efficiency can be improved.

Furthermore, it is preferable that after the base block is brought into contact with the first and second metal members, the friction stir welding is performed while the stirring pin is inserted into the base block. According to the method described above, positioning the rotation tool for joining a pair of metal members which form an inner corner by abutting the pair of metal members each other can be performed with high accuracy at the start position of the friction stir welding where the insertion resistance is high.

Furthermore, it is preferable that after the friction stir welding, further welding is performed on the inner corner portion to give a leg length of a fillet weld by padding welding metal. According to the method described above, the plasticized region formed by the friction stir welding can be repaired.

Advantageous Effects of Invention

According to the rotation tool for joining a pair of metal members which form an inner corner by abutting the pair of metal members each other and the joining inner corner method using the same of the present invention, the equipment cost can be reduced.

BRIEF DESCRIPTION OF DRAWINGS

FIG. 1 is a perspective view showing a rotation tool for joining a pair of metal members which form an inner corner by abutting the pair of metal members each other of the first embodiment;

FIG. 2A is an exploded perspective view,

FIG. 2B is a cross-sectional side view, and

FIG. 2C is a cross-sectional front view;

FIGS. 5A to 5C are diagrams showing joining inner corner methods of the first embodiment:

FIG. 5A shows the preparation process,

FIG. 5B shows the base block arrangement process, and

FIG. 5C shows the friction stir welding process;

FIG. 6A is a perspective view, and

FIG. 6B is a schematic sectional view from the direction of the arrow A of FIG. 5C;

FIG. 8 are side views showing modified examples of a joining inner corner method:

DESCRIPTION OF EMBODIMENTS

First Embodiment

Figure 2A:
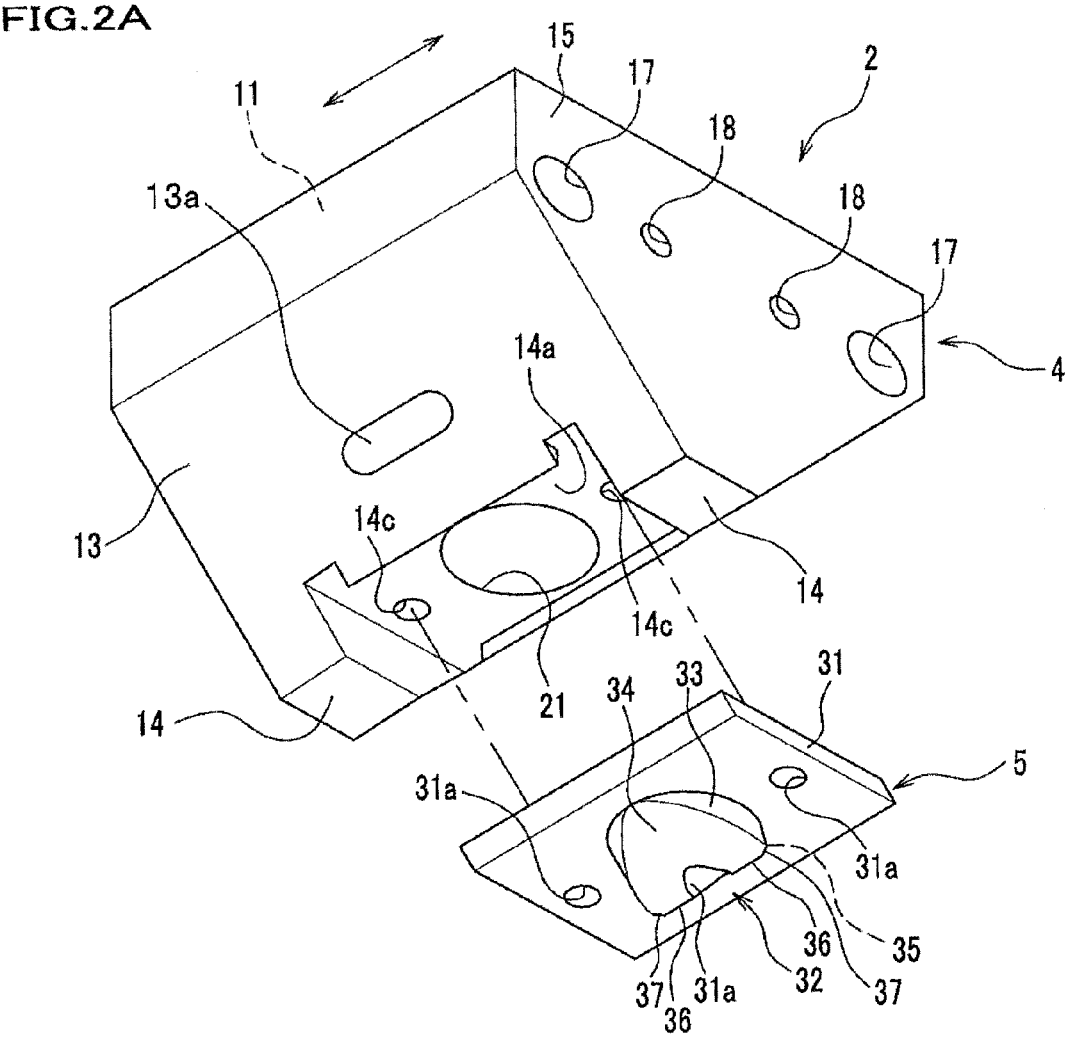
FIGS. 2A to 2C are diagrams showing a base block of the first embodiment.

Hereinafter, the embodiments of the present invention are described in detail with reference to the drawings. Arrow marks shown in FIG. 1 define the directions of Upper and Lower, Right and Left, and Front and Back. As shown in FIG. 1, the rotation tool for joining a pair of metal members which form the inner corner 1 by abutting the pair of metal members each other of the present embodiment has a base block 2 and a stirring pin 3 which penetrates the base block 2.

The base block 2 is a member supporting the stirring pin 3 and to be brought into contact with one and the other of a pair of metal members to be joined respectively. The base block 2 includes a body portion 4 and a shoulder portion 5 which is disposed detachably at the tip (lower side) of the body portion 4.

As shown in FIGS. 1 and 2, the body portion 4 has a substantially trapezoidal shape in appearance that extends downwards becoming thinner. The body portion 4 is a member to be brought into contact with one and the other of the pair of metal members to be joined described below respectively. Moreover, the body portion 4 is a member for maintaining the stirring pin 3 rotatable. The body portion 4 is made of hard metal material in the present embodiment. The body portion 4 includes a top face 11, body sloped faces 12 and 13, an opposing face 14 which is parallel to the top face 11, and a front side face 15 and a back side face 16.

Each of the body sloped faces 12 and 13 is a part that is brought into contact with one and the other of the pair of metal members respectively. In the present embodiment, the opening angle between the pair of metal members (the angle of the inner corner) described below is set to 90 degrees. Therefore, the opening angle between the body sloped faces 12 and 13 forms 90 degrees. However, the opening angle between the body sloped faces 12 and 13 can be set appropriately corresponding to the opening angle between the pair of metal members. In each of the body sloped faces 12 and 13, each of communicating holes 12a and 13a (see FIG. 2C) is bored respectively. The communicating holes 12a and 13a communicate with the body hollow 21 which is formed inside the body portion 4. The communicating holes 12a and 13a are the holes for releasing heat from inside to outside of the body portion 4, during friction stir welding.

The opposing face 14 is formed at the lower end of the body portion 4 to become in parallel to the top face 11. In the middle of the opposing face 14, a mounting face 14a is formed which is set back upper side from the opposing face 14. At the center of the mounting face 14a, an opening is formed. The opening communicates with the body hollow 21 provided inside the body portion 4. Further, the recessed holes 14c, 14c are bored at both sides of the opening of the body hollow 21 in the mounting face 14a. The opposing face 14 is formed in a flat shape. However, other shapes may be employed. For example, the opposing face 14 may be formed in a convex curved shape.

In the body portion 4, the cooling holes 17, 17 are bored. The cooling holes 17, 17 penetrate the body portion 4 from the front side face 15 to the back side face 16. In the present embodiment, the cooling holes 17 are bored at two positions which are apart from each other in the left and right direction. The body hollow 21 is bored between the two cooling holes 17. A coolant can flow through the cooling hole 17, for example, by connecting the cooling holes 17 to pipes or the like via connecting brackets (not shown). The coolant is not specifically limited, however, in the present embodiment, cold water is used. The flow of cold water through the cooling hole 17 suppresses the temperature rise inside of the base block.

At the upper center positions of the front side face 15 and the back side face 16 of the body portion 4, installation holes 18, 18 are bored for securing the body portion 4 to a jig of a friction stir welding device (not shown).

Figure 2B:
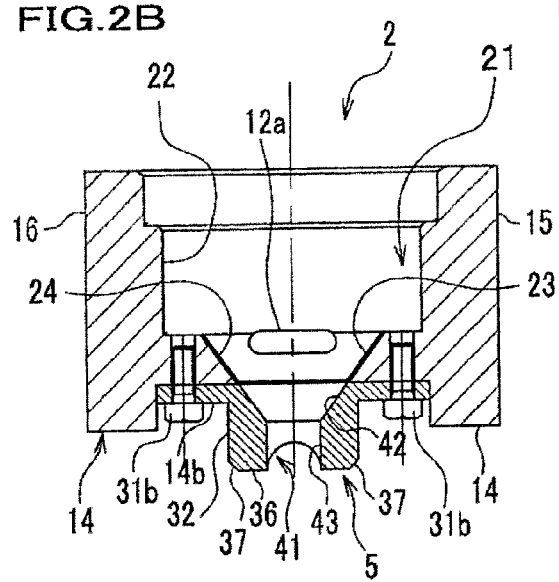

As shown in FIG. 2B, the body hollow 21 is formed in the body portion 4 for allowing the stirring pin 3 to penetrate. The body hollow 21 includes, inside the body portion 4, a body cylindrical hole 22 provided in the upper side and a tapered body hole 23 having a tapered shape provided in the lower side.

The principal axis portion 51 of the stirring pin 3 (see FIG. 3) described below is disposed in the body cylindrical hole 22. The body cylindrical hole 22 is bored in a substantially cylindrical shape. The tapered body hole 23 is bored in a tapered shape that extends downwards becoming thinner. The tapered body hole 23 has an inverse circular truncated cone shape. The tapered stirring pin portion 52 of the stirring pin 3 (see FIG. 3) described below is disposed in the tapered body hole 23. An inclination angle of the tapered body hole 23 from the vertical line may be set equivalent to that of the tapered stirring pin portion 52 described below. In the present embodiment, the angle is set in about 35 degrees.

Figure 2C:
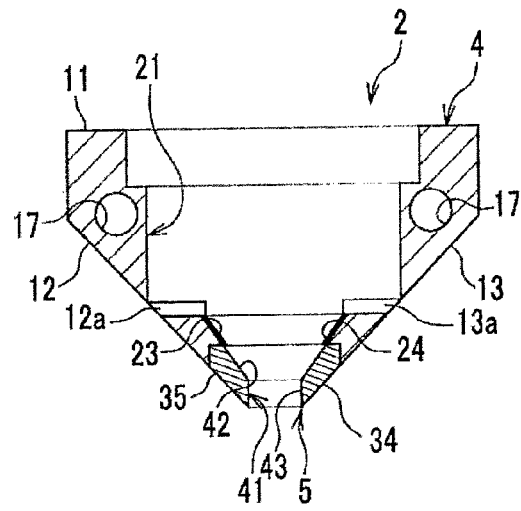

As shown in FIGS. 2B and 2C, a bearing 24 is disposed on the inner circumferential surface of the tapered body hole 23. The bearing 24 is fitted between the body portion 4 and the stirring pin 3. The bearing 24 allows the stirring pin 3 to rotate smoothly on the body portion 4. Types of the bearing 24 are not specifically limited. In the present embodiment, a taper roller bearing is used.

In the present embodiment, the bearing 24 is fitted at the inner circumferential surface of the tapered body hole 23. However, the bearing 24 may be fitted at the inner circumferential surface of the body cylindrical hole 22. In the present embodiment, the body hollow 21 is formed as described above. However, the body hollow 21 is not specifically limited to this embodiment. The body hollow 21 may be formed to support the stirring pin 3 and to allow the stirring pin 3 to be rotatable around the axis. Further, the bearing 24 may be fitted appropriately as necessary.

As shown in FIGS. 2A to 2C, the shoulder portion 5 has a base portion 31 and a projecting portion 32. The projecting portion 32 is formed on the lower face of the base portion 31. The shoulder portion 5 is mounted detachably on the mounting face 14a of the body portion 4. A shoulder hollow 41 which the stirring pin 3 penetrates is formed at the center space inside the shoulder portion 5. The material of the shoulder portion 5 is not specifically limited. In the present embodiment, the shoulder portion 5 may be made of the same metal material as that of the body portion 4.

The base portion 31 has a plate shape. The installation holes 31a, 31a are bored across the projecting portion 32 of the base portion 31. When the base portion 31 is mounted on the mounting face 14a, the installation holes 31a, 31a communicate with the recessed holes 14c, 14c of the body portion 4.

The projecting portion 32 has a trunk portion 33 which includes a cylindrical face. At the trunk portion 33, the shoulder sloped faces 34 and 35 have a shape becoming thinner towards the tip. An opening angle between the shoulder sloped faces 34 and 35 forms 90 degrees. A ridgeline portion 36 is formed at the portion where the shoulder sloped faces 34 and 35 cross each other. The ridgeline portion 36 which is made to abut on or to have a small gap or space from the inner corner portion is disposed opposite to the inner corner portion, during friction stir welding. As shown in FIG. 2B, at the ridgeline portion 36, cut portions 37, 37 which slope in the direction being apart from the ridgeline portion 36 are formed. In the present embodiment, the cut portions 37 are formed at both end sides of the ridgeline portion 36. However, the cut portion 37 may be formed at least one end side of the ridgeline portion 36.

As shown in FIG. 2B, inside the projecting portion 32, a shoulder hollow 41 is formed. The stirring pin 3 is inserted in the shoulder hollow 41. The shoulder hollow 41 includes a tapered shoulder hole 42 which is bored upper side and a tip cylindrical hole 43 which is bored lower side of the tapered shoulder hole 42. The tapered shoulder hole 42 has a tapered shape that extends downwards becoming thinner. The tapered shoulder hole 42 has an inverse circular truncated cone shape. The inclination angle of the tapered shoulder hole 42 from the vertical line may be set equivalent to that of the tapered body hole 23 of the body portion 4 described above. The tapered shoulder hole 42 which is made to abut on or to have a small gap or space from the tapered stirring pin portion 52 (see FIG. 3) is disposed opposite to the tapered stirring pin portion 52.

The tip cylindrical hole 43 is bored under and continuously from the tapered shoulder hole 42. The tip cylindrical hole 43 has a cylindrical shape. The outer diameter of the tip cylindrical hole 43 is formed a little larger than that of the tip 53 (see FIG. 3) of the stirring pin 3 described below.

Next, a process of mounting the shoulder portion 5 on the body portion 4 is described. As shown in FIG. 2B, the shoulder portion 5 is disposed detachably on the body portion 4 via fasteners 31b, 31b. The ridgeline portion 36 of the shoulder portion 5 projects downwards, beyond the opposing face 14 of the body portion 4.

As shown in FIG. 2C, the body sloped face 13 of the body portion 4 is disposed on the same plane as the shoulder sloped face 34 of the shoulder portion 5. Further, the body sloped face 12 of the body portion 4 is formed on the same plane as the shoulder sloped face 35 of the shoulder portion 5.

As described above, it is not specifically limited, however, each of the slopes of the base block 2 is formed to be flush with each other. For example, the shoulder sloped faces 34 and 35 of the shoulder portion 5 may be formed projecting towards the lower side (the inner corner side), beyond the body sloped faces 12 and 13 of the body portion 4.

Figure 3:
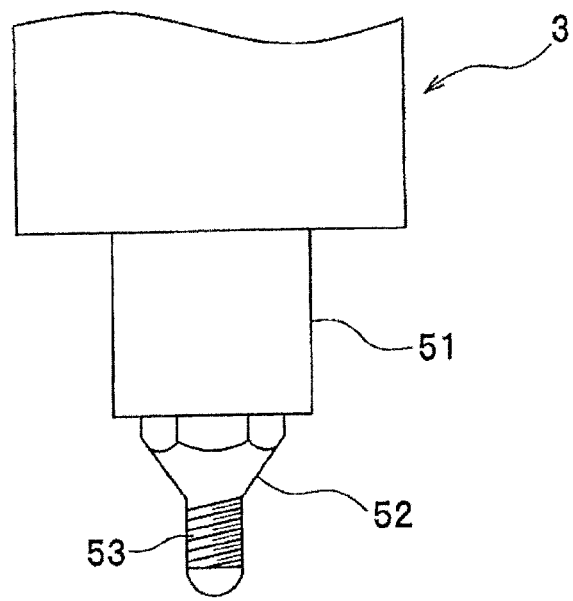
FIG. 3 is a side view showing a stirring pin of the first embodiment.

As shown in FIG. 3, the stirring pin 3 has the principal axis portion 51, the tapered stirring pin portion 52 and the tip 53. The principal axis portion 51, the tapered stirring pin portion 52 and the tip 53 are disposed coaxial with each other. The stirring pin 3 is made to abut on and supported by the base block 2 and is rotated inside the corner portion of the pair of the metal members.

The principal axis portion 51 has a cylindrical shape. The principal axis portion 51 is connected to the driving means of a friction stir welding device (not shown). The principal axis portion 51 is disposed inside the body cylindrical hole 22 (see FIG. 4) of the body portion 4. The tapered stirring pin portion 52 is formed in a shape becoming thinner towards the tip. The vertical section of the tapered stirring pin portion 52 has an inverse circular truncated cone shape. The tapered stirring pin portion 52 is disposed inside the tapered body hole 23 of the body portion 4 and the tapered shoulder hole 42 of the shoulder portion 5.

The tip 53 is suspended from the lower portion of the tapered stirring pin portion 52. The tip 53 has a substantially cylindrical shape. A spiral shaped groove is grooved on the outer circumference face of the tip 53. Preferably, when the stirring pin 3 is made to abut on and supported by the base block 2, the length of the tip 53 is set the end tip to project downwards beyond the end tip of the base block 2.

Figure 4:
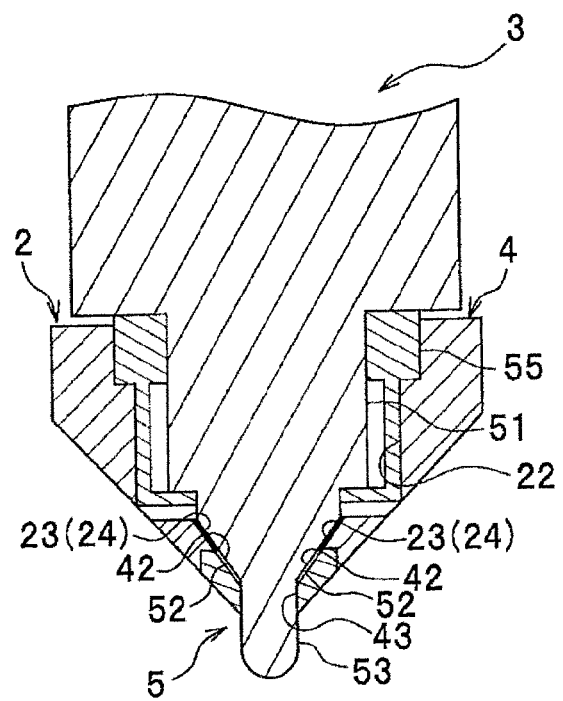
FIG. 4 is a cross-sectional front view showing the rotation tool for joining a pair of metal members which form an inner corner by abutting the pair of metal members each other of the first embodiment.

As shown in FIG. 4, when the base block 2 and the stirring pin 3 are integrally formed into a single body, the stirring pin 3 is inserted into the hollow of the base block 2. Then, the tapered stirring pin portion 52 of the stirring pin 3 is made to abut on and supported by the inner circumferential surface of the tapered body hole 23. In the present embodiment, the bearing 24 is fitted on the inner circumferential surface of the tapered body hole 23. Therefore, the tapered stirring pin portion 52 is brought into contact with the bearing 24. The tip 53 of the stirring pin 3 is inserted through the tip cylindrical hole 43 of the shoulder portion 5. The tip 53 of the stirring pin 3 is disposed to project downwards beyond the ridgeline portion 36 (see FIG. 2B) of the shoulder portion 5.

Further, as shown in FIG. 4, in the present embodiment, an inserting member 55 having a substantially cylindrical shape is secured firmly inside the body portion 4. The inserting member 55 enables a stable rotation of the stirring pin 3 on the body portion 4. The inserting member 55 may be fitted appropriately as necessary.

In addition, when the bearing 24 is not fitted and the tapered body hole 23 and the tapered shoulder hole 42 are bored to be flush with each other, the tapered stirring pin portion 52 of the stirring pin 3 may be brought into contact with the inner circumferential surface of the tapered body hole 23 and the inner circumferential surface of the tapered shoulder hole 42.

Further, in the present embodiment, the tapered portions are formed on the body portion 4 and the stirring pin 3. These tapered portions are facing each other via the bearing tool 24. However, it is not specifically limited to the embodiment. For example, countering horizontal planes are formed inside of the body portion 4 and the periphery of the stirring pin 3. A thrust bearing may be inserted between the countering horizontal planes. According to the structure of the body portion 4 and the stirring pin 3 described above, the stirring pin 3 can be rotated smoothly on the body portion 4.

Next, the joining inner corner method using the rotation tool for joining a pair of metal members which form the inner corner 1 by abutting the pair of metal members each other is described. The joining inner corner method comprises (1) Preparation Process, (2) Base Block Arrangement Process and (3) Friction Stir Welding Process.

(1) Preparation Process

In the preparation process, as shown in FIG. 5A, as well as a first metal member 101 and a second metal member 102 are abutted against each other, a backing member T is arranged. The first metal member 101 and the second metal member 102 are plate shape members. The edge face 102c of the second metal member 102 is abutted against the inner face 101b of the first metal member 101 each other. The edge face 101c of the first metal member 101 is flush with the outer face 102a of the second metal member 102. The opening angle between the first metal member 101 and the second metal member 102 is 90 degrees. The first metal member 101 and the second metal member 102 are made of such metal(s) as are capable of being joined by friction stir welding.

The inner corner portion Z is defined as a corner portion which is constituted by the inner face 101b of the first metal member 101 and the inner face 102b of the second metal member 102. A abutting portion J is defined as a abutting portion which is abutted by the inner face 101b of the first metal member 101 and the edge face 102c of the second metal member 102.

The backing member T is disposed to be brought into contact with the outer face 101a of the first metal member 101 and the outer face 102a of the second metal member 102.

Further, in the preparation process, a pilot hole (not shown) may be bored at the inner corner portion Z first. The pilot hole is bored to reduce the press-in resistance of the stirring pin 3 while being pressed into the inner corner Z. The shape of the pilot hole is not specifically limited. However, the pilot hole is bored in a cylindrical shape and the diameter of the pilot hole is set a little smaller than that of the tip 53 of the stirring pin 3.

Further, in the preparation process, the first metal member 101 and the second metal member 102 may be welded along the inner corner portion Z to perform a preliminary tack welding. After the preliminary tack welding, the first metal member 101 and the second metal member 102 can be prevented from being taken apart from each other when the stirring pin 3 is inserted into the inner corner portion Z.

(2) Base Block Arrangement Process

In the base block arrangement process, as shown in FIG. 5B, the base block 2 alone is disposed on the inner corner portion Z. The ridgeline portion 36 of the shoulder portion 5 of the base block 2 which is made to abut on or to have a small gap or space from the inner corner portion Z is disposed opposite to the inner corner portion Z. Then, the body sloped face 12 of the body portion 4 and the shoulder sloped face 35 of the shoulder portion 5 are brought into contact with the inner face 102b of the second metal member 102. Further, the body sloped face 13 of the body portion 4 and the shoulder sloped face 34 of the shoulder portion 5 are brought into contact with the inner face 101b of the first metal member 101. Consequently, the base block 2 can travel along the longitudinal direction of the inner corner portion Z. The base block 2 has a pair of slopes. However, each of the slopes is brought into contact with one and the other of the first and second metal members 101, 102 respectively. As a result, the base block 2 is prevented from rotating around the vertical axis during friction stir welding.

(3) Friction Stir Welding Process

In the friction stir welding process, as shown in FIG. 5C, friction stir welding is performed while the stirring pin 3 is inserted into the base block 3. In the friction stir welding process, the stirring pin 3 is inserted into the hollow of the base block 3, until the stirring pin 3 is brought into contact with the inner corner Z (or the pilot hole). Then, the stirring pin 3 is rotated and pushed into the base block 2, until the tapered stirring pin portion 52 (see FIG. 4) of the stirring pin 3 is brought into contact with the bearing 24.

Figure 6A:
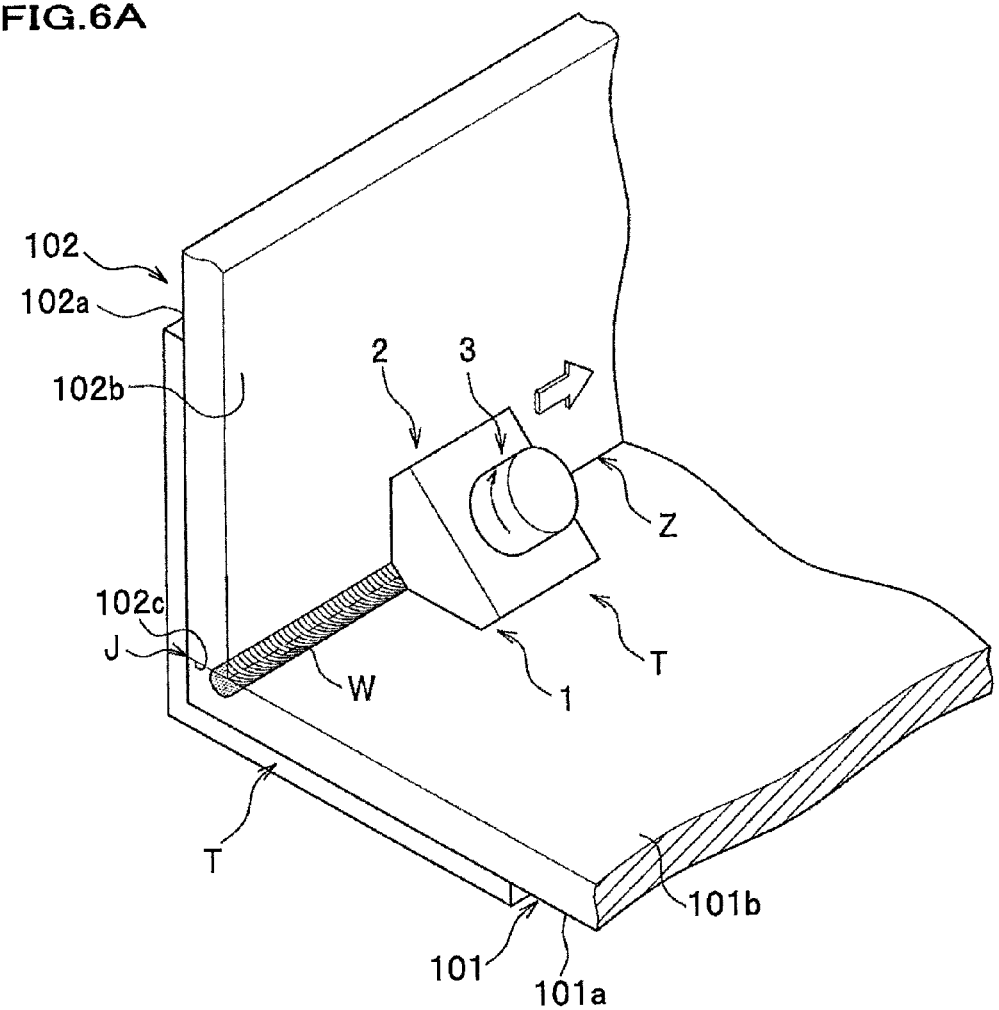
FIGS. 6A to 6B are diagrams showing joining inner corner methods of the first embodiment.

Next, as shown in FIG. 6A, the base block 2 and the stirring pin 3 are traveled along the inner corner Z, while the stirring pin 3 is rotated. The metal around the abutting portion J is plasticized and fluidized to be combined into a single body. Therefore, the first metal member 101 and the second metal member 102 are joined. The plasticized region W is formed at the travelling track of the rotation tool for joining a pair of metal members which form the inner corner 1 by abutting the pair of metal members each other.

As described above, according to the rotation tool for joining a pair of metal members which form the inner corner 1 by abutting the pair of metal members each other of the present embodiment, the shoulder portion 5, which is facing the inner corner portion Z, among the base block 2 is formed detachably. Therefore, it is enough to replace only the worn shoulder portion 5 with new one. Accordingly, it is not necessary to replace the entire base block 2. As a result, the equipment cost can be reduced.

Figure 6B:
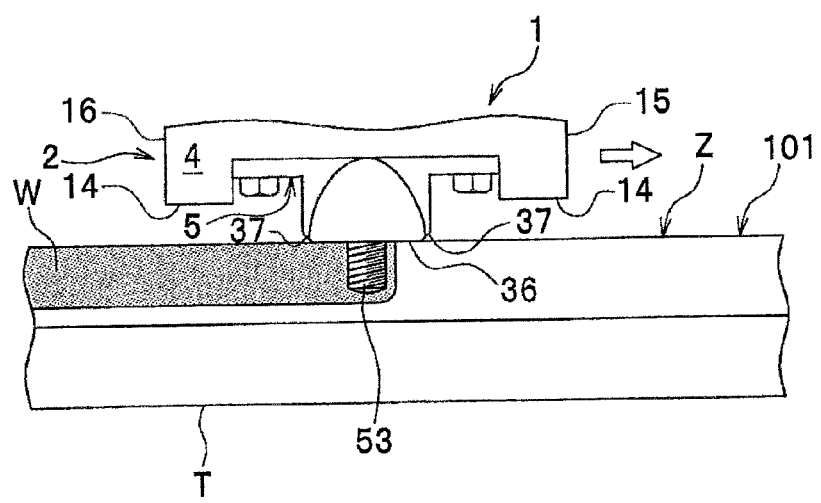

FIG. 6B shows the friction stir welding process according to the first embodiment. FIG. 6B is a schematic view from the direction of the arrow A of FIG. 5C. As shown in FIG. 6B, the opposing face 14 of the body portion 4 is set back from the tip (the ridgeline portion 36) of the shoulder portion 5 in the parting direction from the inner corner portion Z. Therefore, the base block 2 can be prevented from hitting the inner corner portion Z during friction stir welding.

Further, as shown in FIG. 6B, the front side of the ridgeline portion 36 of the shoulder portion 5 in the travelling direction has the cut portion 37. As a result, the shoulder portion 5 can travel smoothly during friction stir welding. Further, in the present embodiment, the back side of the ridgeline portion 36 of the shoulder portion 5 in the travelling direction also has the cut portion 37. Therefore, the shoulder portion 5 can travel smoothly during the reciprocate travelling of the rotation tool for joining a pair of metal members which form the inner corner 1 by abutting the pair of metal members each other.

Further, in the body portion 4, the tapered stirring pin portion 52 of the stirring pin 3 and the tapered body hole 23 (bearing 24) are formed. Therefore, it is enough to perform attaching and detaching the base block 2 and the stirring pin 3 easily by simply contacting or detaching the tapered portions each other. Further, positioning the stirring pin 3 in depth direction at the base block 2 can be performed easily by simply contacting the tapered faces each other.

Further, according to the joining inner corner method of the present embodiment, before friction stir welding, after disposing the base block 2 alone at the inner corner Z, the stirring pin 3 is inserted into the base block 2. As a result, positioning the rotation tool for joining a pair of metal members which form the inner corner 1 by abutting the pair of metal members each other can be performed with high accuracy at the start position of the friction stir welding where the insertion resistance is high.

Second Embodiment

Figure 7:
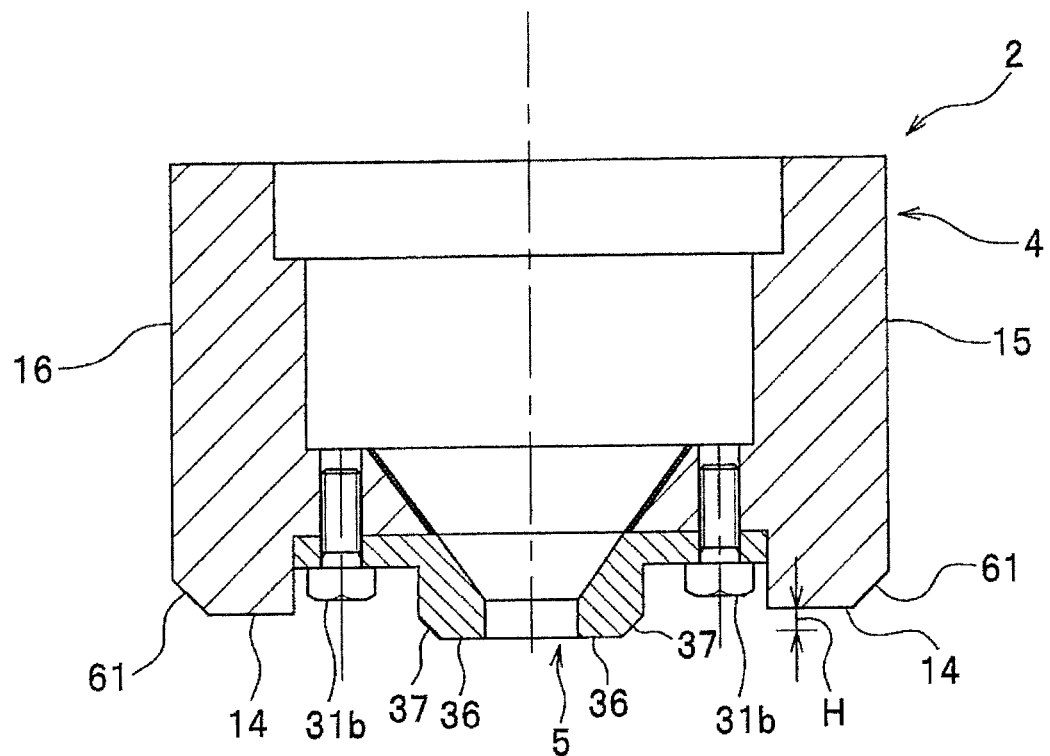
FIG. 7 is a cross-sectional side view showing a base block of a second embodiment.

Next, the second embodiment of the present invention is described. The rotation tool for joining a pair of metal members which form an inner corner by abutting the pair of metal members each other according to the second embodiment differs from the first embodiment at the point that the cut portion 61 is formed on the opposing face 14 of the body portion 4, as shown in FIG. 7. The second embodiment is substantially equivalent to the first embodiment except the structure of body portion 4 (base block 2). Therefore, overlapped description is omitted.

At the lower ends of the body portion 4, each of the cut portions 61, 61 has a sloped face from the opposing face 14 to the front side face 15, or from the opposing face 14 to the back side face 16 respectively. The cut portion 61 has a sloped face based on the opposing face 14 as the base end, to be apart from the inner corner at a certain angle. The cut portion 61 of the body portion 4 prevents the base block 2 from hitting the inner corner portion Z. As a result, the base block can travel smoothly. As shown in FIG. 7 illustrating the second embodiment, when the distance H between the ridgeline portion 36 of the shoulder portion 5 and the opposing face 14 of the body portion 4 is short, it is preferable to form the cut portion 61 on the body portion 4 as well.

In addition, the rotation tool for joining a pair of metal members which form an inner corner by abutting the pair of metal members each other is not specifically limited to the structures of the first and second embodiments. Appropriately, design variations can be modified. In the first embodiment as referred to FIG. 7, the ridgeline portion 36 of the shoulder portion 5 projects downwards beyond the opposing face 14 of the body portion 4. For example, not showing in the drawings, the opposing face 14 of the body portion 4 and the ridgeline portion 36 of the shoulder portion 5 may be formed on the same plane. Further, in the first embodiment, attaching and detaching the body portion 4 and the shoulder portion 5 is performed via the fasteners 31b, 31b. However, other embodiments are possible as long as the body portion 4 and the shoulder portion 5 are formed detachably.

Modified Embodiment

Next, modified embodiments of the joining inner corner method are described. In the first embodiment, the inner face of the first metal member and the edge face of the second metal member are brought into contact with each other. However, the jointing method for metal members is not specifically limited. For example, abutting may be employed as shown in FIG. 8 illustrating the modified embodiments 1 to 4.

Modified Embodiment 1

Figure 8A:
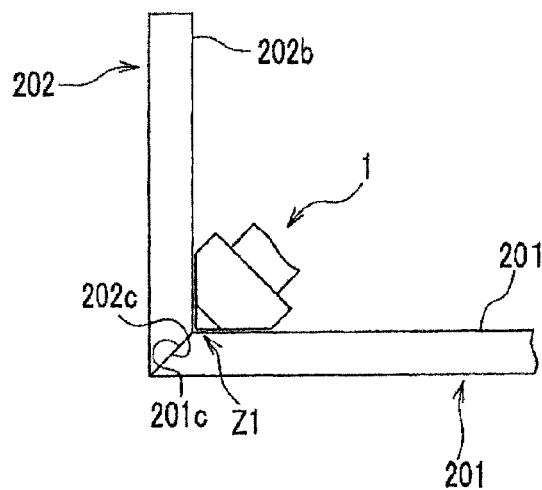
FIG. 8A shows a modified example 1.

As shown in FIG. 8A, according to the modified embodiment 1, the end portions of the first and second metal members 201 and 202 are cut at 45 degree angle respectively. Then, both the edge faces 201c and 202c of the first and second metal members 201 and 202 are abutted against each other (fillet weld joint). The inner corner portion Z1 is formed by the inner face 201b of the first metal member 201 and the inner face 202b of the second metal member 202. In the joining inner corner method, the friction stir welding may be performed using the rotation tool for joining a pair of metal members which form the inner corner 1 by abutting the pair of metal members each other on the inner corner portion Z1.

Modified Embodiment 2

Figure 8B:
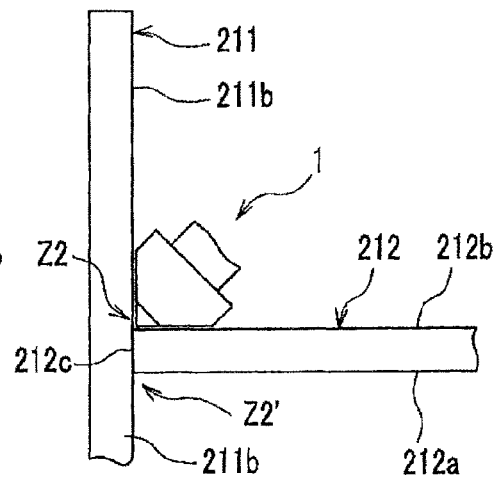
FIG. 8B shows a modified example 2.

As shown in FIG. 8B, according to the modified embodiment 2, the pair of metal members are formed in T-shape by abutting an inner face 211b of the first metal member 211 and the edge face 212c of the second metal member 212 against each other. The inner corner portion Z2 is formed by the inner face 211b of the first metal member 211 and the inner face 212b of the second metal member 212. Further, the inner corner portion Z2' is formed by the inner face 211b of the first metal member 211 and the outer face 212a of the second metal member 212. In the joining inner corner method, the friction stir welding may be performed using the rotation tool for joining a pair of metal members which form the inner corner 1 by abutting the pair of metal members each other on the inner corner portions Z2 and Z2'.

Modified Embodiment 3

Figure 8C:
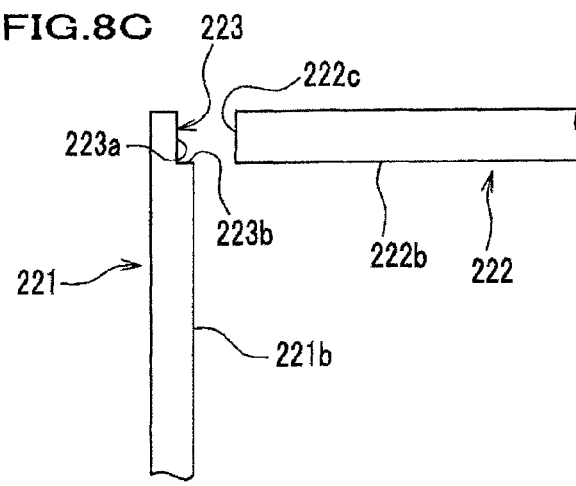
FIGS. 8C and 8D show modified examples 3.
Figure 8D:
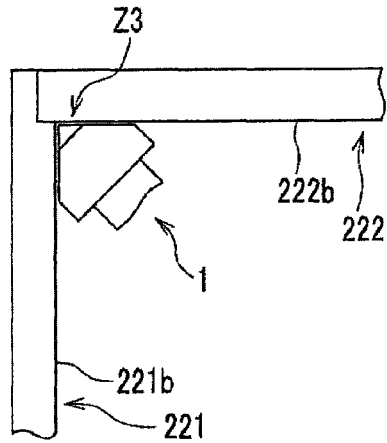

As shown in FIG. 8C, according to the modified embodiment 3, the step portion 223 formed on the end portion of the first metal member 221 and the edge face 222c of the second metal member 222 are abutted against each other. The step portion 223 includes a bottom face 223a and wall portion 223b which rises from the bottom face 223a. The bottom face 223a is brought into contact with the edge face 222c of the second metal member 222. The wall portion 223b is brought into contact with the inner face 222b of the second metal member 222. As shown in FIG. 8D, the inner corner portion Z3 is formed by the inner face 221b of the first metal member 221 and the inner face 222b of the second metal member 222. The formed step portion 223 allows a stable abutting of the first metal member 221 and the second metal member 222 against each other. In the joining inner corner method, the friction stir welding may be performed using the rotation tool for joining a pair of metal members which form the inner corner 1 by abutting the pair of metal members each other on the inner corner portion Z3.

Modified Embodiment 4

Figure 8E:
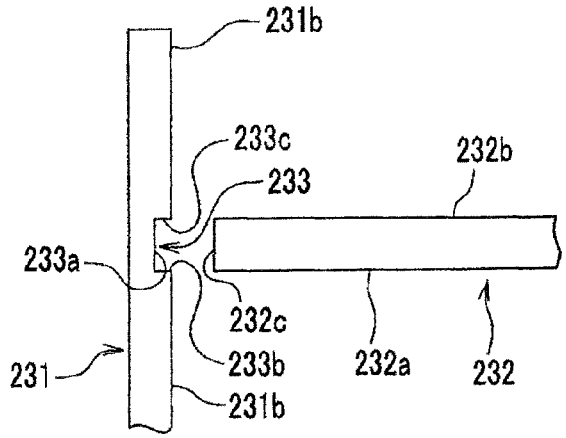
FIGS. 8E and 8F show modified examples 4.
Figure 8F:
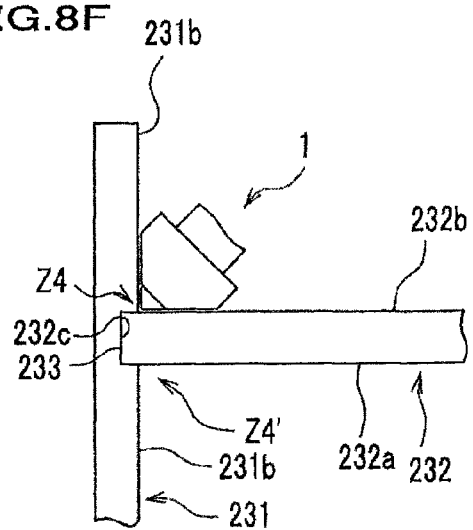

As shown in FIG. 8E, according to the modified embodiment 4, the pair of metal members are formed in T-shape by abutting the concave groove 233 formed on the first metal member 231 and the edge face 232c of the second metal member 232 against each other. The concave groove 233 includes a bottom face 233a, wall portions 233b and 233c which rise from the bottom face 233a. The bottom face 233a is brought into contact with the edge face 232c of the second metal member 232. The wall portion 233b is brought into contact with an outer face 232a of the second metal member 232. The wall portion 233c is brought into contact with an inner face 232b of the second metal member 232. As shown in FIG. 8F, the inner corner portion Z4 is formed by the inner face 231b of the first metal member 231 and the inner face 232b of the second metal member 232. Further, the inner corner portion Z4' is formed by the inner face 231b of the first metal member 231 and the outer face 232a of the second metal member 232. The formed concave groove 233 allows a stable abutting of the first metal member 231 and the second metal member 232 against each other. In the joining inner corner method, the friction stir welding may be performed using the rotation tool for joining a pair of metal members which form the inner corner 1 by abutting the pair of metal members each other on the inner corner portions Z4 and Z4'.

Another Embodiment

Figure 9:
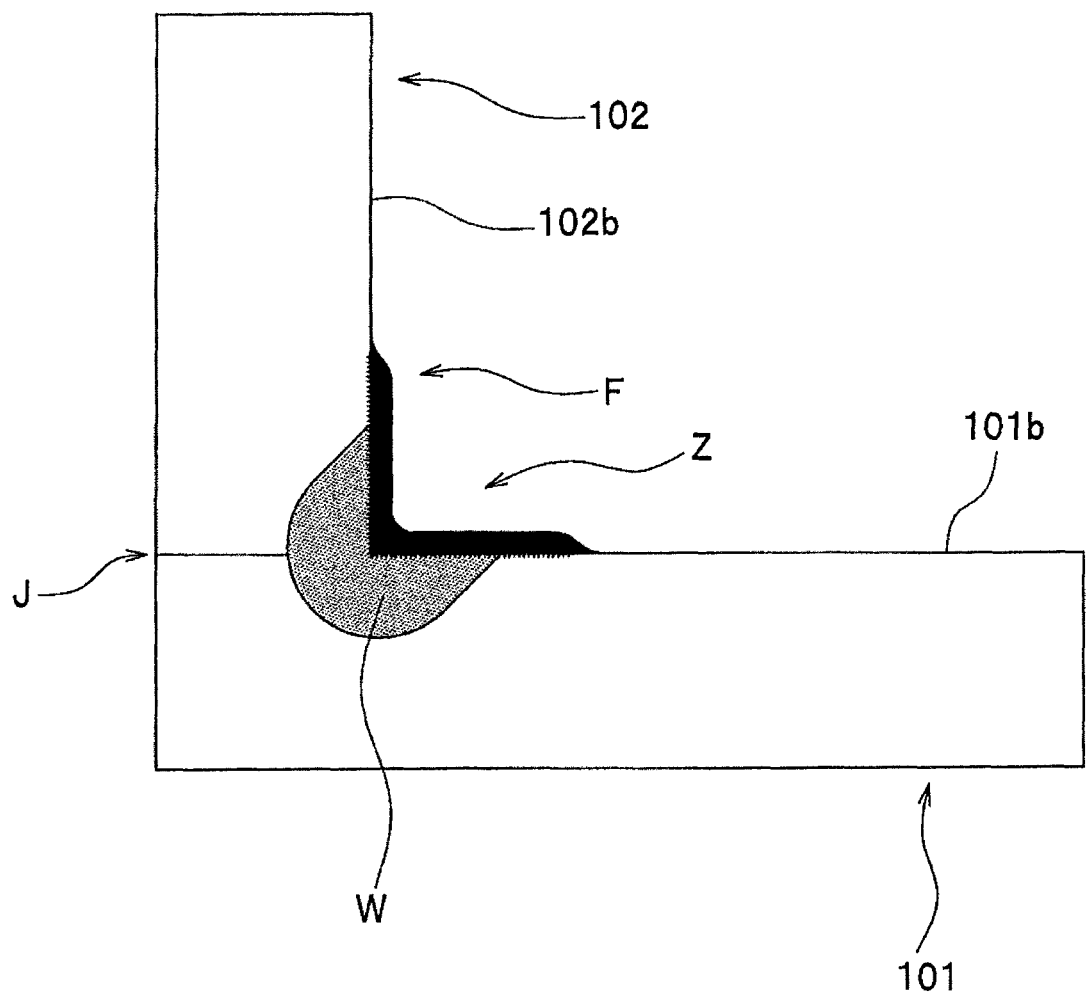
FIG. 9 is a side view showing the other embodiment of a joining inner corner method.

As shown in FIG. 9, according to another embodiment of the joining inner corner method, after the friction stir welding process of the joining inner corner method, repairing process is performed by welding the plasticized region W. In the repairing process, the surface of the plasticized region W is covered with welding metal F by padding welding metal. That is, the inner corner Z is given a leg length of a fillet weld. Accordingly, even if the surface of plasticized region W is rough by the friction stir welding, the surface can be flattened.

REFERENCE SIGNS LIST 1 rotation tool for joining a pair of metal members which form an inner corner by abutting the pair of metal members each other
2 base block
3 stirring pin
4 body portion
5 shoulder portion
12 body sloped face
13 body sloped face
14 opposing face
17 cooling hole
21 body hollow
22 body cylindrical hole
23 tapered body hole
24 bearing
34 shoulder sloped face
35 shoulder sloped face
36 ridgeline portion
37 cut portion
41 shoulder hollow
42 tapered shoulder hole
43 tip cylindrical hole
51 principal axis portion
52 tapered stirring pin portion
53 tip
61 cut portion

What is claimed is:

1. A rotation tool for joining a pair of metal members which form an inner corner by abutting the pair of metal members against each other by performing friction stir welding on an inner corner portion formed by abutting the pair of metal members against each other comprising:
   a stirring pin to be inserted into the inner corner portion, including a tapered stirring pin portion; and
   a base block for supporting the stirring pin and to be brought into contact with both of the pair of metal members respectively,
   wherein the base block includes:
   a body portion having a tapered body hole that becomes thinner towards a tip of the body portion and a bearing disposed on an inner circumferential surface of the tapered body hole; and
   a shoulder portion mounted detachably at the tip of the body portion,
   wherein a tapered shoulder hole is formed at a center space inside the shoulder portion such that the tapered stirring pin portion is disposed inside the tapered body hole and the tapered shoulder hole, wherein the body portion has an opposing face, opposite to the inner corner portion, formed on the tip of the body portion, and a tip of the shoulder portion projects towards a tip side of the stirring pin beyond the opposing face.

2. The rotation tool according to claim 1, wherein the body portion has a sloping cut portion formed at one end portion on the tip of the body portion, being apart from the tip side of the stirring pin.

3. The rotation tool according to claim 1, wherein the shoulder portion has a sloping cut portion formed at one end portion on the tip of the shoulder portion, being apart from the tip side of the stirring pin.

4. The rotation tool according to claim 1, wherein
   the tapered body hole has a tapered shape that becomes thinner towards the tip inside the body portion, and
   the tapered stirring pin portion has a tapered shape that becomes thinner towards the tip, wherein the tapered stirring pin portion is made to abut on and be supported by the inner circumferential surface of the tapered body hole.

5. The rotation tool according to claim 1, wherein the body portion has a cooling hole for a coolant flow.

6. The rotation tool according to claim 1, wherein the bearing is disposed between the body portion and the stirring pin.

7. A method for joining an inner corner using the rotation tool according to claim 1, wherein friction stir welding is performed on an inner corner portion formed by abutting a pair of a first metal member and a second metal member against each other.

8. The joining method according to claim 7, wherein preliminary tack welding is performed on the inner corner portion, before performing the friction stir welding on the inner corner portion.

9. The joining method according to claim 7, wherein after the base block is brought into contact with the first and second metal members, the friction stir welding is performed while the stirring pin is inserted into the base block.

10. The joining method according to claim 7, wherein after the friction stir welding, further welding is performed on the inner corner portion to give a leg length of a fillet weld by padding welding metal.

* * * * *